(12) United States Patent
Takeuchi et al.

(10) Patent No.: US 9,827,981 B2
(45) Date of Patent: Nov. 28, 2017

(54) CONTROL DEVICE FOR HYBRID VEHICLE

(71) Applicant: HONDA MOTOR CO., LTD., Tokyo (JP)

(72) Inventors: Masahiro Takeuchi, Wako (JP); Atsushi Izumiura, Wako (JP); Masanori Matsushita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 14/784,188

(22) PCT Filed: Apr. 11, 2014

(86) PCT No.: PCT/JP2014/060505
§ 371 (c)(1),
(2) Date: Oct. 13, 2015

(87) PCT Pub. No.: WO2014/175080
PCT Pub. Date: Oct. 30, 2014

(65) Prior Publication Data
US 2016/0052511 A1 Feb. 25, 2016

(30) Foreign Application Priority Data

Apr. 22, 2013 (JP) .................. 2013-089430

(51) Int. Cl.
*B60W 20/40* (2016.01)
*B60K 6/48* (2007.10)
(Continued)

(52) U.S. Cl.
CPC .............. *B60W 20/40* (2013.01); *B60K 6/48* (2013.01); *B60K 6/547* (2013.01); *B60L 11/14* (2013.01);
(Continued)

(58) Field of Classification Search
CPC .... B60W 20/40; B60W 30/188; B60W 10/26; B60W 10/02; B60W 10/06; B60W 10/08;
(Continued)

(56) References Cited

U.S. PATENT DOCUMENTS 6,524,217 B1 * 2/2003 Murakami ............. B60K 6/365
180/65.225
2015/0112524 A1 * 4/2015 Wang .................... B60W 10/06
701/22

(Continued)

FOREIGN PATENT DOCUMENTS

CN 101790476 A 7/2010
DE 11 2007 000 225 T5 2/2009
(Continued)

OTHER PUBLICATIONS

US Department of Energy, Alternative Fuels Data, Batteries for Hybrid and Plug-In Electric Vehicles, Sep. 13, 2012.*
(Continued)

*Primary Examiner* — Redhwan K Mawari
*Assistant Examiner* — Alan D Hutchinson
(74) *Attorney, Agent, or Firm* — Westerman, Hattori, Daniels & Adrian, LLP

(57) ABSTRACT

A control device for a hybrid vehicle includes a push-start mode and a motor start mode. The push-start mode transmits a driving force from driving wheels to the engine via a first transmission route at a speed detected by a speed detection means equal to or more than a predetermined speed to start the engine. The motor start mode starts the engine using a driving force of the motor at a speed equal to or less than the predetermined speed as well as in a stopped state. At a speed outside a speed range that either mode is executable when a start command of the engine occurs in driving only using the electric motor as the driving source, a control means per-
(Continued)

forms the driving force reduction control for reducing a driving force transmitted from the electric motor to the driving wheels of the vehicle.

21 Claims, 10 Drawing Sheets

(51) Int. Cl.
| | |
|---|---|
| *B60K 6/547* | (2007.10) |
| *B60L 11/14* | (2006.01) |
| *B60W 10/02* | (2006.01) |
| *B60W 10/06* | (2006.01) |
| *B60W 10/08* | (2006.01) |
| *F02N 5/04* | (2006.01) |
| *F02N 11/00* | (2006.01) |
| *B60L 15/20* | (2006.01) |
| *B60L 11/18* | (2006.01) |
| *B60W 10/26* | (2006.01) |
| *B60W 30/188* | (2012.01) |

(52) U.S. Cl.
CPC ....... *B60L 11/1861* (2013.01); *B60L 15/2009* (2013.01); *B60L 15/2054* (2013.01); *B60W 10/02* (2013.01); *B60W 10/06* (2013.01); *B60W 10/08* (2013.01); *B60W 10/26* (2013.01); *B60W 30/188* (2013.01); *F02N 5/04* (2013.01); *F02N 11/00* (2013.01); *B60K 2006/4816* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/80* (2013.01); *B60L 2250/26* (2013.01); *B60L 2260/26* (2013.01); *B60W 2520/10* (2013.01); *B60Y 2300/49* (2013.01); *F02N 2200/0801* (2013.01); *F02N 2300/2002* (2013.01); *Y02T 10/6221* (2013.01); *Y02T 10/6256* (2013.01); *Y02T 10/6286* (2013.01); *Y02T 10/645* (2013.01); *Y02T 10/70* (2013.01); *Y02T 10/7077* (2013.01); *Y02T 10/7275* (2013.01); *Y10S 903/915* (2013.01)

(58) Field of Classification Search
CPC .............. B60L 11/1861; B60L 15/2054; B60L 15/2009; B60L 11/14; F02N 5/04; F02N 11/00; B60K 6/48; B60K 6/547; Y10S 903/915; Y02T 10/645; Y02T 10/6221
See application file for complete search history.

(56) References Cited

U.S. PATENT DOCUMENTS

| | | | |
|---|---|---|---|
| 2016/0016580 A1* | 1/2016 | Johri | .................. F02N 5/04 477/5 |
| 2016/0052511 A1 | 2/2016 | Takeuchi et al. | |

FOREIGN PATENT DOCUMENTS

| | | |
|---|---|---|
| EP | 2 192 013 A1 | 6/2010 |
| JP | 2001-107763 A | 4/2001 |
| JP | 2006-009751 A | 1/2006 |
| JP | 2007-325417 A | 12/2007 |
| JP | 2009-035188 A | 2/2009 |
| JP | 4225317 B2 | 2/2009 |
| JP | 2009-107502 A | 5/2009 |
| JP | 4285571 B2 | 6/2009 |
| JP | 2009-166567 A | 7/2009 |
| JP | 4297116 B2 | 7/2009 |
| JP | 2010-089537 A | 4/2010 |
| JP | 2010-184613 A | 8/2010 |
| JP | 2011-213181 A | 10/2011 |
| JP | 2013-043479 A | 3/2013 |
| WO | 2007/086273 A1 | 8/2007 |
| WO | 2014/175080 A1 | 10/2014 |

OTHER PUBLICATIONS

Machine Translation of Japanese Patent 2009/166567.*
International Search Report dated Jul. 1, 2014, issued in counterpart Application No. PCT/JP2014/060505 (2 pages).
Office Action dated Aug. 18, 2016, issued in counterpart Canadian Application No. 2,909,980. (2 pages).
Examination Search Report dated Aug. 15, 2016, issued in counterpart Canadian Patent Application No. 2,909,980. (1 page).
Office Action dated May 10, 2016, issued in Japanese Application No. 2015-513679, with English translation (6 pages).
Notice of Reasons for Rejection dated Sep. 27, 2016, issued in counterpart Japanese Patent Application No. 2015-513679, with English translation. (8 pages).
Extended (supplementary) European Search Report dated Feb. 7, 2017, issued in counterpart European Patent Application No. 14787878.9 (5 pages).
Notice of Reasons for Rejection dated Jan. 22, 2017, issued in counterpart Chinese Patent Application No. 201480021142.4, with English translation. (21 pages).

* cited by examiner

CONTROL DEVICE FOR HYBRID VEHICLE

TECHNICAL FIELD

The present invention relates to a driving device for a hybrid vehicle provided with an engine (internal combustion engine) and an electric motor as driving sources, a control device for the hybrid vehicle provided with a control means for controlling the driving device, and in particular relates to improvement of control in shifting from a state of motor single driving to a state of driving using the engine after starting the engine.

BACKGROUND ART

As a transmission for a vehicle, in recent years, a so-called dual clutch type transmission is known. In order to avoid an interruption of mechanical power transmission at a time of shifting, the dual clutch type transmission includes a first clutch and a second clutch. The first clutch can engage between an input shaft of a first shifting mechanism structured by odd number gear positions (hereinafter referred to as "first input shaft") and an output shaft of an internal combustion engine (hereinafter referred to as "engine output shaft"). The second clutch can engage between an input shaft of a second shifting mechanism structured by even number gear positions (hereinafter referred to as "second input shaft") and the engine output shaft. The dual clutch type transmission changes gears by alternately engaging these two clutches. When shifting from one of the odd number gear positions to one of the even number gear positions, for example, the dual clutch type transmission releases the first clutch for transmitting a mechanical power to the even number gear position and engages the second clutch for transmitting the mechanical power to the even gear position of which a gear pair is beforehand in mesh. Thus, the dual clutch type transmission avoids the interruption of power transmission at the time of shifting.

Further, Patent document 1 discloses a hybrid type driving device for a vehicle including two shifting mechanisms similar to the above-mentioned ones, and further including an electric motor for engaging with an input shaft of one of the shifting mechanisms. Such hybrid type driving device for the vehicle has three modes of power supply, which are an engine single driving, a motor single driving and a hybrid driving in combination between the engine and the motor. Which mode to be applied is controlled appropriately depending on a driving condition of the vehicle.

And now, since the engine is stopped in the motor single driving state, the engine needs to start in shifting from the motor single driving to the engine driving while the vehicle is driving. Thus, the hybrid type driving device is configured to start the engine (perform cranking) using a rotation of the motor for the vehicle driving or a rotation due to a driving force transmitted from a driving wheel side, and establish an appropriate gear position after starting the engine to perform the engine driving. For this purpose, the hybrid type driving device has a motor start mode and a push-start mode as modes of engine start control. The motor start mode engages the first clutch to start the engine using the driving force of the electric motor during the motor single driving that only uses the motor (electric motor) as the driving source. In a state in which the driving wheels and the engine are stopped, the push-start mode sets each of the gear positions of the first shifting mechanism to neutral and in turn engages the first clutch to start the engine using the driving force transmitted from the driving wheel side.

Incidentally, the above-described push-start mode has a minimum vehicle speed at which the push-start mode is executable. Therefore, if continuing the motor driving at a vehicle speed less than the minimum vehicle speed, the push-start start mode might fail to start the engine, leading to a shortage of state of charge (SOC) of the battery (capacitor). Further, in performing the above-mentioned motor start mode, the hybrid type driving device can transmit no driving force to the driving wheel side due to the first shifting mechanism being neutral. Therefore, when running on a hill-climbing road, the vehicle might move backward under a condition unintended by a driver.

It should be noted that Patent documents 2 to 4 disclose prior arts for performing an engine start control using an electric motor while a hybrid vehicle is running. In order to maintain a stopped state against torque generated by the motor at a time of engine start demand, the hybrid vehicle described in Patent document 2 imparts predetermined braking torque from a braking torque imparting means and in turn generates predetermined torque from the motor after imparting the braking torque. Further, a starting control device for a hybrid vehicle disclosed in Patent document 3 sets a driving system to a neutral position to start an engine using a driving force of a motor. In addition, a control device for a hybrid vehicle disclosed in Patent document 4 starts an engine using inertia torque of the vehicle by fastening a first fastening element at a time of issuing engine start demand during a coast driving in an electric car mode.

However, Patent documents 2 to 4 disclose no art for coping with problems that continuing the motor driving at a vehicle speed less than the minimum vehicle speed of the above-described push-start mode might cause a shortage of state of charge of the battery, and the vehicle might move backward under the condition unintended by the driver in performing the above-described motor start mode.

RELATED ART DOCUMENTS

Patent Documents

[Patent document 1] Japanese Patent No. 4285571
[Patent document 2] Japanese Patent 4225317
[Patent document 3] Japanese Patent 4297116
[Patent document 4] Japanese Unexamined Patent Application Publication No. 2009-035188

DISCLOSURE OF THE INVENTION

Problems to be Solved by the Invention

In view of the above-described problems, the present invention has an object to provide a control device for a hybrid vehicle that can achieve an increase in timing for starting the engine in the motor single driving mode and prevent the vehicle from moving backward at the time of engine start.

Means of Solving the Problems

In order to solve the above-described problems, a control device for a hybrid vehicle in accordance with the present invention includes an engine and an electric motor as driving sources, a driving device, a control means and a vehicle speed detection means. The driving device can change speed of a mechanical power from the engine and the electric motor and in turn transmit the power to a vehicle propeller shaft that engages with driving wheels. The control means controls a vehicle driving using the driving device. As transmission routes of a driving force, the driving device has at least a first transmission route between the engine and the driving wheels, a second transmission route between the electric motor and the driving wheels and a third transmission route between the motor and the engine. As modes for starting the engine in the motor single driving, which is a vehicle driving only using the electric motor as the driving source, the driving device enables a push-start mode and a motor start mode. In the push-start mode, at a vehicle speed detected by the vehicle speed detection means equal to or more than a predetermined vehicle speed, the driving device transmits a driving force from the driving wheels to the engine via the first transmission route to start the engine. In the motor start mode, at a vehicle speed detected by the vehicle speed detection means equal to or less than another predetermined vehicle speed, as well as in a stopped state, the driving device starts the engine using a driving force of the motor via the third transmission route. If a vehicle speed detected by the speed detection means is out of a vehicle speed range in which either of the push-start mode or the motor start mode is executable when a start command of the engine occurs in driving only using the electric motor as the driving source, the control means performs a driving force reduction control for reducing the driving force transmitted from the electric motor to the driving wheels of the vehicle.

According to the control device for the hybrid vehicle in accordance with the present invention, on one hand, the push-start mode, which transmits a driving force from the driving wheels to the engine via the first transmission route to start the engine is executable only at a vehicle speed detected by the vehicle speed detection means equal to or more than a predetermined vehicle speed. On the other hand, the motor start mode, which starts the engine using a driving force of the motor via the third communication route, is executable only at a vehicle speed equal to or less than another predetermined vehicle speed, as well as in the stopped state. And, a vehicle speed range in which the engine fails to start in the above-described push-start mode and the above-described motor start mode is limited to a relatively low-speed range, including a state of driving at an extremely low speed in a traffic congestion and a state of driving on a hill-climbing road at a low speed. Therefore, here, when the vehicle is driving at a vehicle speed in such vehicle speed range, the control device performs a control to reduce the driving force transmitted from the electric motor to the driving wheels of the vehicle for shifting from this vehicle speed range to another vehicle speed range. Accordingly, the control device promotes an increase in vehicle speed due to an increase in accelerator opening by the vehicle driver's stepping on an accelerator pedal or a decrease in vehicle speed by the vehicle driver's stepping on a brake, thereby increasing the vehicle speed up to a speed range in which the engine can start in the push-start mode, or reduce the vehicle speed down to a speed range in which the engine can start in the motor start mode. Thus, shifting the engine to the vehicle speed range in which the engine can start can achieve an increase in timing for starting the engine, allowing to avoid a shortage of state of charge of the battery associated with the motor single driving.

Further, the control device for the hybrid vehicle in accordance with the present invention includes the engine and the electric motor as the driving sources. The control device also includes the driving device and the control means. The driving device changes speed of a mechanical power from the engine and the electric motor and in turn transmits the power to the vehicle propelling shaft that engages with the driving wheels. The control means controls a vehicle driving using the driving device. The control device also includes the first shifting mechanism, the second shifting mechanism, a first clutch and a second clutch. The first shifting mechanism receives to an first input shaft the mechanical power from an output shaft of the engine and the electric motor and in turn changes gears using either one of a plurality of gear positions, thereby allowing to transmit the mechanical power to the vehicle propeller shaft. The second shifting mechanism receives to a second input shaft the mechanical power from an output shaft of the internal combustion engine and in turn changes gears using either one of the plurality of gear positions, thereby allowing to transmit the mechanical power to the vehicle propeller shaft. The first clutch can engage between the output shaft of the engine and the first input shaft. The second clutch can engage between the output shaft of the engine and the second input shaft. The vehicle speed detection means detects the vehicle speed. As modes for starting the engine in the motor single driving, which uses only the electric motor as the driving source, the control device enables the push-start mode and the motor start mode. At a vehicle speed detected by the vehicle speed detection means equal to or more than a predetermined vehicle speed in a state in which the vehicle is driving while a driving force is being transmitted from the electric motor to the driving wheel side via the first shifting mechanism, the push-start mode establishes either one of the gear positions of the second shifting mechanism and puts the second clutch in engagement to transmit the driving force from the driving wheels to the engine via the second shifting mechanism and the second clutch and consequently start the engine. At a vehicle speed detected by the vehicle speed detection means equal to or less than a predetermined vehicle speed as well as in the stopped state, the motor start mode shifts any of the gear positions of the first shifting mechanism to neutral and puts the first clutch in engagement, thereby starting the engine using the driving force of the electric motor. At a vehicle speed detected by the vehicle speed detection means out of the vehicle speed range in which either of the push-start mode or the motor start mode is executable when a start command of the engine occurs in driving only using the electric motor as the driving source, the control means performs a driving force reduction control for reducing the driving force transmitted from the electric motor to the driving wheels of the vehicle.

As a mode for starting the engine in the motor single driving only using the electric motor as the driving source, the driving device of dual clutch type of the above-described configuration in accordance with the present invention enables the push-start start mode and the motor start mode. The push-start mode establishes either one of the gear positions of the second shifting mechanism and puts the second clutch in engagement in the state in which the vehicle is driving while a driving force is being transmitted from the electric motor to the driving wheel side via the first shifting mechanism, thereby transmitting the driving force from the driving wheels to the engine via the second shifting mechanism and the second clutch and consequently starting the engine. The motor start mode shifts any of the gear positions of the first mechanism to neutral and puts the first clutch in engagement, thereby starting the engine using the driving force of the electric motor. And, on one hand, the above-described push-start mode is executable only if a vehicle speed detected by the vehicle speed detection means is equal to or more than a predetermined vehicle speed. On the other hand, the motor start mode is executable only if a vehicle speed is equal to or less than another predetermined vehicle speed, as well as in the stopped state. The vehicle speed range in which the engine fails to start in the above-described push-start mode and the motor start mode is limited to a relatively low-speed range, including a state of driving at an extremely low speed in a traffic congestion and a state of driving on a hill-climbing at a low speed. Therefore, here, when the vehicle is driving at a vehicle speed in such vehicle speed range, the control device performs a control to reduce the driving force transmitted from the electric motor to the driving wheels of the vehicle for shifting from this vehicle speed range to another vehicle speed range. Accordingly, the control device promotes an increase in vehicle speed due to an increase in accelerator opening by the vehicle driver's stepping on an accelerator pedal or a decrease in vehicle speed by the vehicle driver's stepping on a brake so as to increase the vehicle speed up to a speed range in which the engine can start in the push-start mode or reduce the vehicle speed down to a speed range in which the engine can start in the motor start mode. Thus, shifting the engine to the vehicle speed range in which the engine can start can achieve an increase in timing for starting the engine, allowing to avoid a shortage of state of charge of the battery associated with the motor single driving.

Further, the above-described control device for the hybrid vehicle includes an accelerator opening detection means for detecting an accelerator opening. And, the control means should cancel the driving force reduction control at an accelerator opening detected by the accelerator opening detection means equal to or more than a predetermined opening during the driving force reduction control.

If continuing the driving force reduction control at the accelerator opening equal to or more than the predetermined opening in response to an acceleration demand of the vehicle from the vehicle driver during the driving force reduction control, the vehicle driver might feel a sense of incongruity with a running condition of the vehicle such as an impression of being short of accelerated velocity of the vehicle. Therefore, at the accelerator opening equal to or more than the predetermined opening, the control means should cancel the driving force reduction control for preventing the driver from feeling the impression of being short of accelerated velocity.

Further, in cancellation of the driving force reduction control, the control means of the above-described control device for the hybrid vehicle should again perform the driving force reduction control at an accelerator opening detected by the accelerator opening detection means less than the predetermined opening.

If the driver cancels or weakens stepping on the accelerator pedal after the cancellation of the driving force reduction control, the control means should perform the driving force reduction control again to press the vehicle driver to step on the accelerator pedal or the brake pedal, thereby increasing the vehicle speed up to a range in which the push-start mode can start the engine or decreasing the vehicle speed up to a range in which the motor start mode can start the engine.

In addition, the above-described control device for the hybrid vehicle includes a breaking force imparting means for imparting a braking force to the vehicle. At a low vehicle speed detected by the vehicle speed detection means equal to or less than a predetermined value during the driving force reduction control, the control means should brake the vehicle using the breaking force imparting means and start the engine in the motor start mode.

At a low vehicle speed detected by the vehicle speed detection means equal to or less than the predetermined value, the control means starts the engine in the motor start mode while braking the vehicle using the breaking force imparting means, thereby allowing to prevent the vehicle from moving backward due to a decrease in vehicle speed caused by the driving force reduction control when the vehicle is driving on the hill-climbing road. The braking of the vehicle using the breaking force imparting means here is a means that can impart the braking force to the vehicle regardless of with or without an operation of the vehicle driver (brake by wire). This can impart the braking force to the vehicle without the operation of the vehicle driver.

Further, the control device for the hybrid vehicle should start the engine in the push-start mode at a vehicle speed detected by the vehicle speed detection means equal to or more than the predetermined vehicle speed during the driving force reduction control.

Further, the control device for the hybrid vehicle includes a gradient detection means for detecting a gradient of a road surface on which the vehicle is driving. Depending on the gradient of the road surface detected by the gradient detection means, the control means should expand a vehicle speed range in which the engine is allowed to start in the push-start mode.

In this configuration, expanding the vehicle speed range in which the engine is allowed to start in the push-start mode depending on the gradient of the road surface detected by the gradient detection means can prioritize the engine start in the push-start mode. This can avoid a shortage of state of charge of the battery during the motor single driving and secure the vehicle driving.

In addition, the control device for the hybrid vehicle includes the gradient detection means for detecting the gradient of the road surface on which the vehicles is driving. At a gradient of the road surface detected by the gradient detection means equal to or more than a predetermined value, the control means should perform the driving force reduction control.

At a gradient of the road surface detected by the gradient detection means less than the predetermined value (for instance, in a case of running on a flat road or a downhill road), the vehicle has no risk of staying in a vehicle speed range in which the engine fails to start in the push-start mode and in the motor start mode. Further, the vehicle has no risk of moving backward due to an inertial force to the vehicle. Therefore, only at the gradient of the road surface on which the vehicle is driving equal to or more than the predetermined value (for instance, when the road is judged as a hill-climbing road), the control means may perform the driving force reduction control to shift the vehicle to a vehicle speed range allowing the motor start mode or the push-start mode.

Further, in the control device for the hybrid vehicle, a predetermined delay time should be set for a time from issuing a command of the driving force reduction control using the control means to an execution thereof. Setting the predetermined delay time (hysteresis) for the time from issuing the command of the driving force reduction to the execution thereof can prevent hunting of the driving force reduction control.

In addition, the control device for the hybrid vehicle includes a capacitor for giving and receiving an electric power to and from the electric motor and a state of charge detection means for detecting a state of charge of the capacitor. Depending on the state of charge of the capacitor detected by the state of charge detection means, the control means should vary the vehicle speed range in which the push-start mode is executable.

According to this configuration, a change in range for starting the engine in the push-start mode depending on a state of charge of the capacitor can prevent a shortage of state of charge of the capacitor more effectively.

In addition, the above-described control device for the hybrid vehicle includes the capacitor that can give and receive an electric power to and from the electric motor and the state of charge detection means for detecting a state of charge of the capacitor. At a state of charge of the capacitor detected by the state of charge detection means equal to or less than a predetermined value, the control means should issue an engine start command.

According to this configuration, starting the engine at the state of charge of the capacitor equal to or less than the predetermined value can securely avoid a shortage of capacity of the capacitor in the motor single driving and accordingly secure the vehicle driving.

The control device for the hybrid vehicle in accordance with the present invention can achieve an increase in timing for starting the engine in the motor single driving mode and prevent the vehicle from moving backward at the time of engine starting.

MODE FOR CARRYING OUT THE INVENTION

Figure 1:
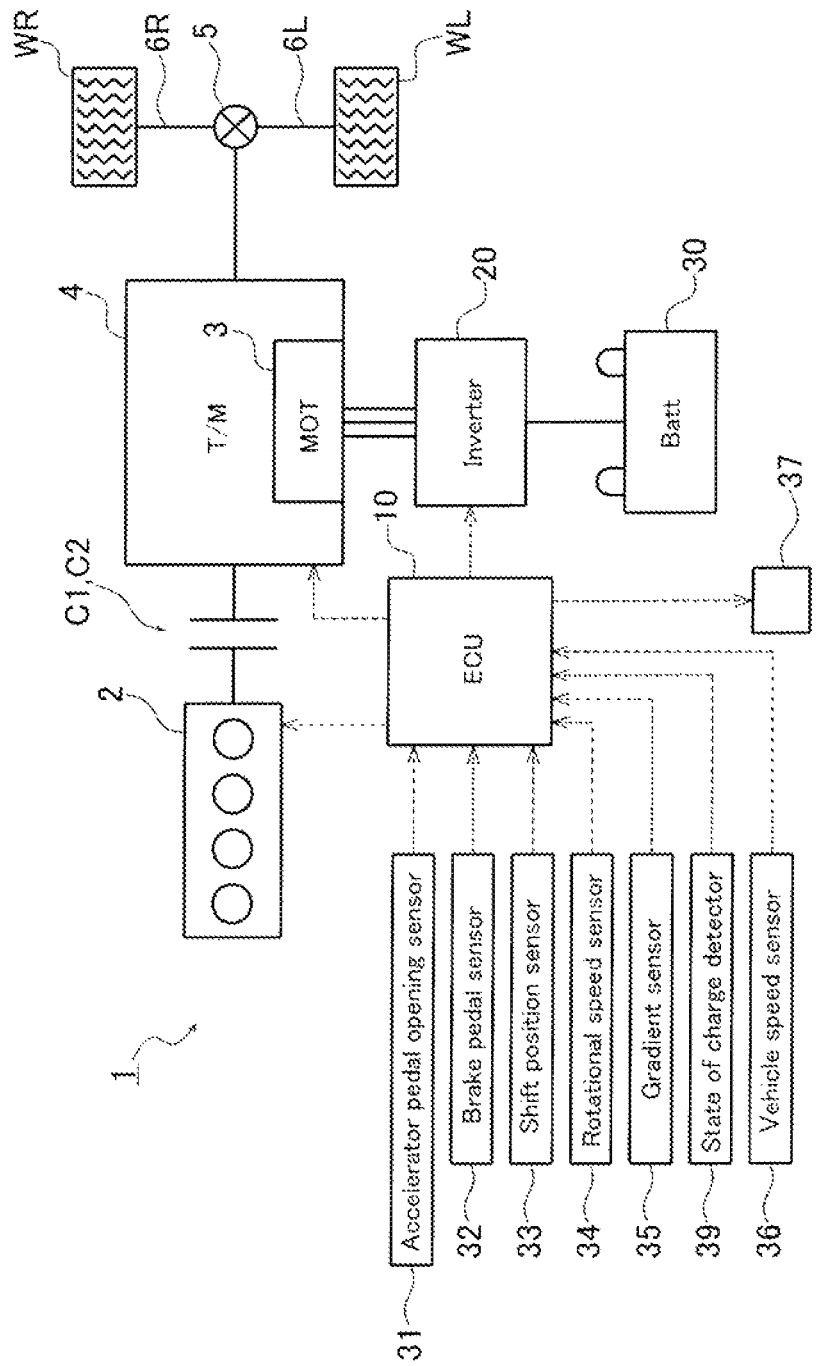
FIG. 1 is a schematic diagram illustrating an exemplary configuration of a hybrid motor vehicle provided with a control device according to one embodiment of the present invention.

An embodiment of the present invention will now be described in detail with reference to the accompanying drawings. FIG. 1 is a schematic diagram illustrating an exemplary configuration of a hybrid motor vehicle provided with a control device according to one embodiment of the present invention. As shown in FIG. 1, the vehicle 1 of the present embodiment is a hybrid vehicle including an engine (internal combustion engine) 2 and an electric motor 3 as driving sources. Furthermore, the vehicle 1 includes an inverter (electric motor control means) 20 for controlling the electric motor 3, a battery 30, a transmission 4, a differential mechanism 5, right and left drive shafts 6R. 6L and right and left driving wheels WR, WL. Here, the motor 3 includes a motor generator. The battery 30 includes a capacitor. The engine 2 is an internal combustion engine including a diesel engine or a turbo engine. A rotary driving force of the engine 2 and the electric motor (hereinafter referred to simply as "motor") 3 is transmitted to the right and left driving wheels WR. WL via the transmission 4, the differential mechanism 5 and the drive shafts 6R, 6L.

Further, the vehicle 1 includes an electronic control unit (ECU) 10 for controlling the engine 2, the motor 3, the transmission 4, the differential mechanism 5 and the inverter (electric motor control means) 20 and the battery 30. The electronic control unit 10 may not only be structured as one whole unit, but also by a plurality of ECUs such as an engine ECU for controlling the engine 2, a motor generator ECU for controlling the motor 3 and the inverter 20, a battery ECU for controlling the battery 30 and an AT-ECU for controlling the transmission 4. The electronic control unit 10 of the present embodiment controls the motor 3, the battery 30 and the transmission 4 as well as the engine 2.

Depending on various driving conditions, the electronic control unit 10 performs a control to perform a motor single driving (EV driving) using only the motor 3 as the driving source, performs a control to perform an engine single driving using only the engine 2 as the driving source and performs a control to perform a cooperative driving (HEV driving) using the motor 3 together with the engine 2 as the driving sources. In addition, according to known various kinds of control parameters, the electronic control unit 10 performs a protection control for the inverter 20 in a stall state of the motor 3, to be described later, and performs controls necessary for other various kinds of driving.

Further, various signals are input to the electronic control unit 10 as control parameters. The various signals include signals corresponding to an accelerator pedal opening from an accelerator pedal sensor (accelerator opening detection means) for detecting a stepping-on amount of the accelerator pedal 31, a brake pedal opening from a brake pedal sensor 32 for detecting a stepping-on amount of the brake pedal, a shift position from a shift position sensor 33 for detecting a gear position (shift position), a motor rotational speed from a rotational speed sensor 34 for detecting a rotational speed of the motor 3, a gradient from a gradient detection sensor (gradient detection means) 35 for detecting a gradient of the vehicle 1, a state of charge from a state of charge detector (state of charge detection means) 39 for measuring a state of charge (SOC) of the battery 30 and a vehicle speed from a vehicle speed sensor (vehicle speed detection means) 36 for detecting a vehicle speed. Furthermore, to the electronic control unit 10, data related to a condition of a road on which the vehicle is currently driving (for instance, a flat road, an uphill road and a downhill road) may be input from a car navigation system mounted on the vehicle, which is omitted in the figure. In addition, the vehicle 1 is provided with a brake (braking means) 37 for braking the driving wheels WR, WL. A control signal from the ECU10 is input to the brake 37, enabling a configuration (brake by wire) that can impart a predetermined braking force to the driving wheels WR, WL depending on the control signal, but without depending on a vehicle driver's intention (operation of the brake pedal).

The engine 2 is the internal combustion engine that mixes fuel with air to burn, thereby generating a driving force for driving the vehicle 1. In the cooperative driving with the engine 2 and the motor 3 and the single driving only using the motor 3, the motor 3 functions as a motor that generates a driving force for driving the vehicle 1 using electric energy of the battery 30. At a time of deceleration of the vehicle 1, the motor 3 functions as a generator for generating electricity due to a regeneration of the motor 3. At a time of regeneration of the motor 3, the battery 30 is charged with electric power (regeneration energy) generated by the motor 3.

Figure 2:
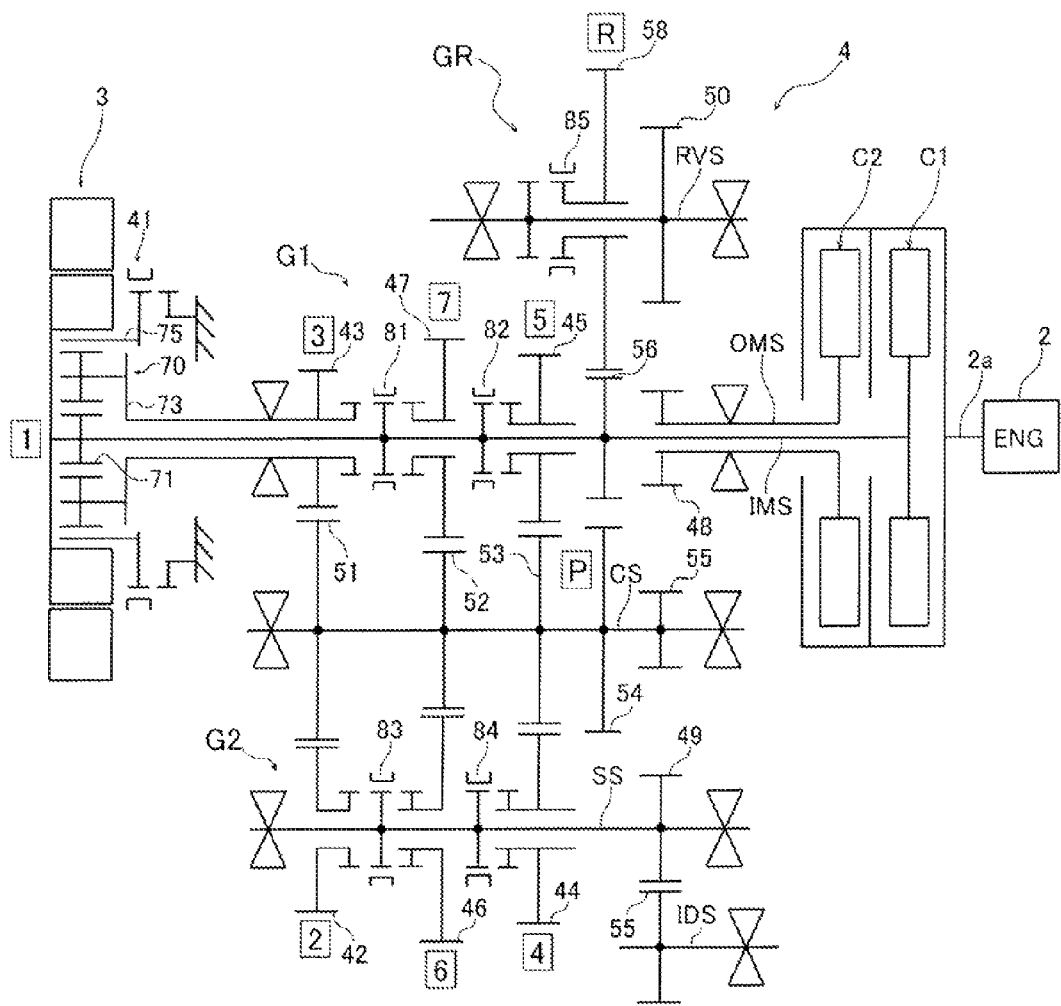
FIG. 2 is a skeleton view of a transmission shown in FIG. 1.
Figure 3:
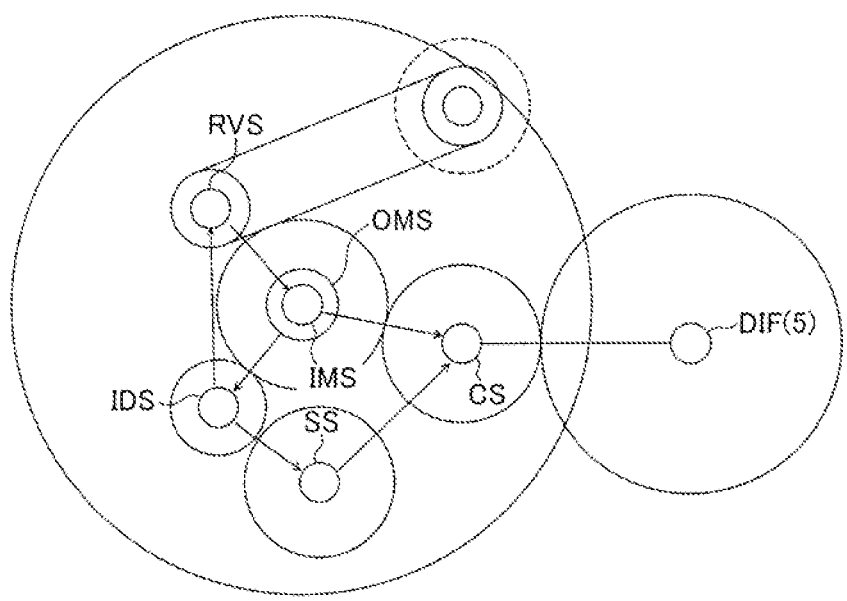
FIG. 3 is a conceptual diagram illustrating engagement relationships between shafts in the transmission shown in FIG. 2.

Next, a configuration of the transmission 4 provided by the vehicle of the present embodiment will be described. FIG. 2 is a skeleton view of the transmission 4 shown in FIG. 1. FIG. 3 is a conceptual diagram illustrating engagement relationships between shafts in the transmission shown in FIG. 2. The transmission 4 is a parallel shaft-type transmission having seven forward gears and one reverse gear, and also a dry-type twin-clutch-type transmission (DCT: dual clutch transmission).

The transmission 4 is provided with an inner main shaft (first input shaft) IMS, an outer main shaft (second input shaft) OMS, a secondary shaft (second input shaft) SS, an idle shaft IDS, a reverse shaft RVS and a countershaft CS. The inner main shaft (first input shaft) IMS is connected to a crankshaft 2a, structuring an engine output shaft of the engine 2, and to the motor 3. The outer main shaft (second input shaft) OMS structures an outer cylinder of the inner main shaft IMS. Each of the secondary shaft (second input shaft) SS, the idol shaft IDS and the reverse shaft RVS is parallel to the inner main shaft IMS. The countershaft CS, structuring an output shaft, is parallel to these shafts.

These shafts are arranged so that the outer main shaft OMS is constantly engaged with the reverse shaft RVS and the secondary shaft SS via the idle shaft IDS, and the countershaft CS is constantly engaged with the differential mechanism 5 (See FIG. 1).

Further, the transmission 4 includes a first clutch C1 for odd number gear positions and a second clutch C2 for even number gear positions. The first and second clutches C1. C2 are dry-type clutches. The first clutch C1 is connected to the inner main shaft IMS. The second clutch C2 is connected to the outer main shaft OMS (part of the second input shaft) and coupled to the reverse shaft RVS and the secondary shaft SS (part of the second input shaft) from a gear 48 fixed on the outer main shaft OMS via the idle shaft IDS.

A sun gear 71 of a planetary gear mechanism 70 is fixedly arranged to a predetermined place on a motor 3 side of the inner main shaft IMS. Further, a carrier 73 of the planetary gear mechanism 70 structuring a first drive gear, a third drive gear 43, a seventh drive gear 47 and a fifth drive gear 45 are arranged on an outer periphery of the inner main shaft IMS as shown in FIG. 2 from the left side in order. Each of the third drive gear 43, the seventh drive gear 47 and the fifth drive gear 45 is rotatable relatively to the inner main shaft IMS. The gear 43 is coupled to the carrier 73 of the planetary mechanism 70. Furthermore, on the inner main shaft IMS, a third to seventh gear synchromesh mechanism (selector mechanism) 81 is axially slidably arranged between the third drive gear 43 and the seventh drive gear 47, and a fifth gear synchromesh mechanism (selector mechanism) 82 is axially slidably arranged corresponding to the fifth drive gear 45. Sliding the synchromesh mechanism (selector mechanism) corresponding to a desired gear stage couples the gear stage to the inner main shaft IMS. These gears and the synchromesh mechanisms arranged in connection with the inner main shaft IMS constitute a first shifting mechanism G1 for establishing the even number gear positions. Each of the drive gears of the first shifting mechanism G1 meshes with a corresponding driven gear provided on the countershaft CS to rotatably drive the countershaft CS.

On an outer periphery of the secondary shaft SS (second input shaft), a second drive gear 42, a sixth drive gear 46 and a fourth drive gear 44 are relatively rotatably arranged as shown in FIG. 2 from the left side in order. Furthermore, on the secondary shaft SS, a second to sixth speed synchromesh mechanism 83 is axially slidably arranged between the second drive gear 42 and the sixth drive gear 46, and a fourth speed synchromesh mechanism (selector mechanism) 84 corresponding to the fourth drive gear 44 is axially slidably arranged. In this case also, sliding the synchromesh mechanism (selector mechanism) corresponding to the desired gear position couples a gear stage to the secondary shaft SS (second input shaft). These gears and synchromesh mechanisms provided in connection with the secondary shaft SS (second input shaft) constitute a second shifting mechanism G2 for establishing the even number gear positions. Each of the drive gears of the second shifting mechanism G1 also meshes with a corresponding driven gear provided on the countershaft CS to rotatably drive the countershaft CS. It should be noted that a gear 49 fixed to the secondary shaft SS is connected to a gear 55 on the idle shaft IDS, and connected to the second clutch C2 from the idol shaft IDS via the outer main shaft OMS.

A reverse drive gear 58 is relatively rotatably arranged on an outer periphery of the reverse shaft RVS. In addition, on the reverse shaft RVS, a reverse synchromesh mechanism 85 is axially slidably arranged corresponding to the reverse drive gear 58, and a gear 50 engaged with the idle shaft IDS is fixed. In reverse driving, sliding the synchronization of the synchromesh mechanism 85 and engaging the second clutch C2 transmits a rotation of the second clutch C2 to the reverse shaft RVS via the outer main shaft OMS and the idle shaft IDS, thereby rotating the reverse drive gear 58. The reverse drive gear 58 meshes with the gear 56 on the inner main shaft IMS. Thus, when the reverse drive gear 58 rotates, the inner main shaft IMS rotates in a direction opposite to a forward direction. The reverse rotation of the inner main shaft IMS is transmitted to the countershaft CS via the gear (third drive gear) 43 coupled to the planetary gear mechanism 70.

On the countershaft CS, a second to third driven gear 51, a sixth to seventh driven gear 52, a fourth to fifth driven gear 53, a parking gear 54 and a final drive gear 55 are fixedly arranged as shown in FIG. 2 from the left side in order. The final drive gear 55 meshes with a differential ring gear (not shown in the figure) of the differential mechanism 5, whereby a rotation of the output shaft of the countershaft CS is transmitted to the input shaft (namely, vehicle propeller shaft) of the differential mechanism 5. In addition, a brake 41 for stopping a rotation of the ring gear 75 is installed on the ring gear 75 of the planetary gear mechanism 70.

In the transmission 4 of the above-described configuration, sliding a synchronous sleeve of the second to sixth speed synchromesh mechanism 83 to a left direction connects the second drive gear 42 to the secondary shaft SS. And, sliding the synchronous sleeve to a right direction connects the sixth drive gear 46 to the secondary shaft SS. In addition, sliding a synchronous sleeve of the fourth speed synchromesh mechanism 84 to the right direction connects the fourth drive gear 44 to the secondary shaft SS. Thus, an engagement of the second clutch C2 in a state in which one of the even drive gear positions is selected sets the transmission 4 to one of the even gear positions (second, fourth or sixth speed).

Sliding a synchronous sleeve of the third to seventh speed synchromesh mechanism 81 to the left direction connects the third drive gear 43 to the inner main shaft IMS to select the third gear position. And, sliding the synchronous sleeve to the right direction connects the seventh drive gear 47 to the inner main shaft IMS to select the seventh gear position. In addition, sliding a synchronous sleeve of the fifth speed synchromesh mechanism 82 to the right direction connects the fifth drive gear 45 to the inner main shaft IMS to select the fifth gear position. In a state (neutral state) in which neither of the gears 43, 47, 45 is selected by the synchromesh mechanisms 81, 82, a rotation of the planetary gear mechanism 70 is transmitted to the countershaft CS via the gear 43 coupled to the carrier 73 to select the first gear position. Thus, an engagement of the first clutch C1 in a state in which one of the odd drive gear positions is selected sets the transmission 4 to one of the odd gear positions (first, third, fifth or seventh speed).

As a transmission route of a driving force, the transmission 4 of the above-described configuration includes a first transmission route between the engine 2 and the driving wheels WR, WL, a second transmission route between the motor 3 and the driving wheels WR, WL, and a third transmission route between the motor 3 and the engine 2. The first transmission route is a route for transmitting a driving force via the second clutch C2 and the second shifting mechanism G2 between the engine 2 and the driving wheels WR, WL. The second transmission route is a route for transmitting a driving force via the first shifting mechanism G1 between the motor 3 and the driving wheels WR, WL. The third transmission route is a route for transmitting a driving force via the first clutch C1 between the motor 3 and the engine 2 via the first clutch C1.

A determination of a gear position to be established in the transmission 4 and a control for establishing the gear position (a selection of a gear position in the first shifting mechanism G1 and the second shifting mechanism G2, namely, a switching control of synchronization, and a control of engagement and disengagement of the first clutch C1 and the second clutch C2) are performed, as is known in the art, using the electronic control unit 10 according to a driving condition.

A starting and driving of the vehicle only using the motor 3 of the vehicle of the above-described configuration (EV driving) will be described below. For the starting and driving using the motor 3, the third to seventh speed synchromesh mechanism 81 is put in gear to a gear 43 side, and the first and second clutches C1, C2 are disengaged. The disengagement of the first and second clutches C1, C2 interrupts a transmission of a driving force between the inner main shaft IMS or the outer main shaft OMS and the engine 2. In this state, applying torque in a normal rotation direction to the motor 3 transmits a driving force of the motor 3 to the driving wheels WR, WL from the planetary gear mechanism 70 via the gears 43, 51, the countershaft CS and the idle shaft IDS. This enables the vehicle to start and drive only due to the torque of the motor 3. Next, a control of starting the engine 2 during the above-described motor driving will be described below. The first clutch C1 is engaged to start the engine 2 during the motor driving. Thus, a driving force transmitted to the inner main shaft IMS from the gear 43 via the third to seventh speed synchromesh mechanism 81 causes the crank shaft 2a of the engine 2 to corotate and be cranked, thereby allowing to start the engine. After starting the engine 2, returning the third to seventh synchromesh mechanism 81 to neutral can continue the motor driving. Alternatively, another technique for starring the engine 2 during the motor driving may be to engage the second to sixth speed synchromesh mechanism 83 with the second drive gear 42 and in turn engage the second clutch C2. Furthermore, an engagement of another gear position can also start the engine 2 using the motor 3.

The control of starting the engine 2 in the motor driving as described above will be referred to as a push-start mode below. In the push-start mode, the driving force of the motor 3 is transmitted to the driving wheels WR, WL in the state in which the first and second clutches C1, C2 are disengaged, thereby starting and driving the vehicle, and afterwards, the first clutch C1 is engaged to rotate the crank shaft 2a of the engine 2 using the driving force transmitted from the driving wheels WR, WL, thereby starting the engine 2. This push-start mode is executable, as will be described later, only at a vehicle speed V detected by the vehicle speed sensor 36 equal to or more than a predetermined vehicle speed.

A control of starting the engine 2 using the driving force of the motor 3 while the vehicle is stopped will be described below. In order to start the engine 2 using the driving force of the motor 3 while the vehicle is stopped, first, all of the synchromesh mechanisms 81 to 84 of the first and second shifting mechanisms G1, G2 are set to neutral (neutral position), the first clutch C1 is engaged, and the inner main shaft IMS is coupled to the crank shaft 2a. Afterwards, due to a rotation of the motor 3, the inner main shaft IMS causes the crank shaft 2a of the engine 2 to corotate and be cranked, thereby allowing to start the engine 2. Hereinafter, the above-described mode in which the engine 2 is started using the driving force of the motor 3 by setting all of the synchromesh mechanisms 81 to 84 to neutral and engaging the first clutch C1, will be referred to as the motor start mode. In this motor start mode, the first shifting mechanism G1 being at neutral disallows the driving force to be transmitted to the driving wheels WR, WL side. Therefore, in order to prevent the vehicle from moving backward in a condition unintended by the vehicle driver, the motor start mode is performed while performing a brake cooperative control, which will be described later, in a state in which a vehicle speed V detected by the vehicle speed sensor 36 is equal to or less than a predetermined speed (in a state in which the vehicle is substantially stopped).

Figure 4:
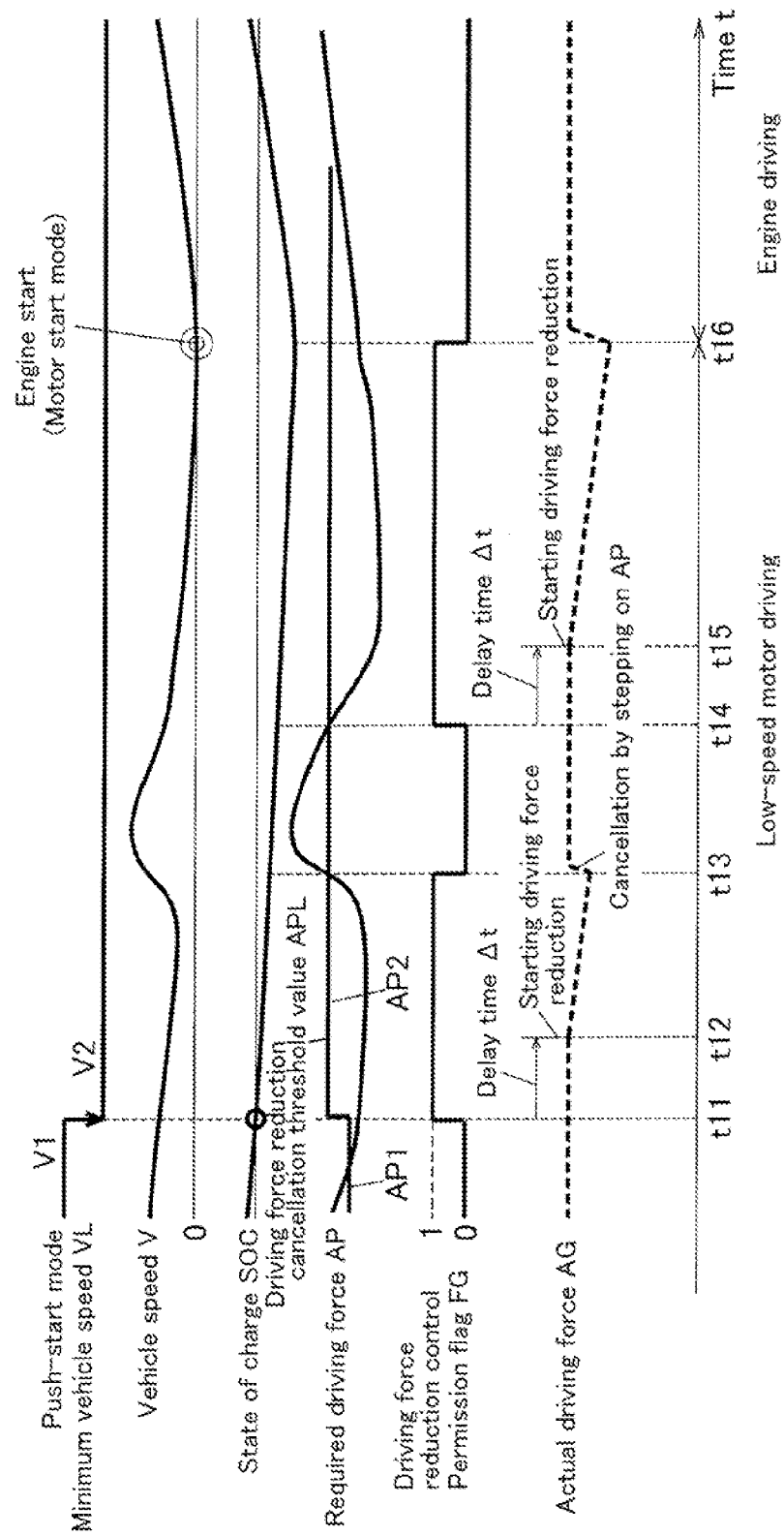
FIG. 4 is a timing chart illustrating changes in various values at an engine start in a motor start mode in a motor single driving.
Figure 5:
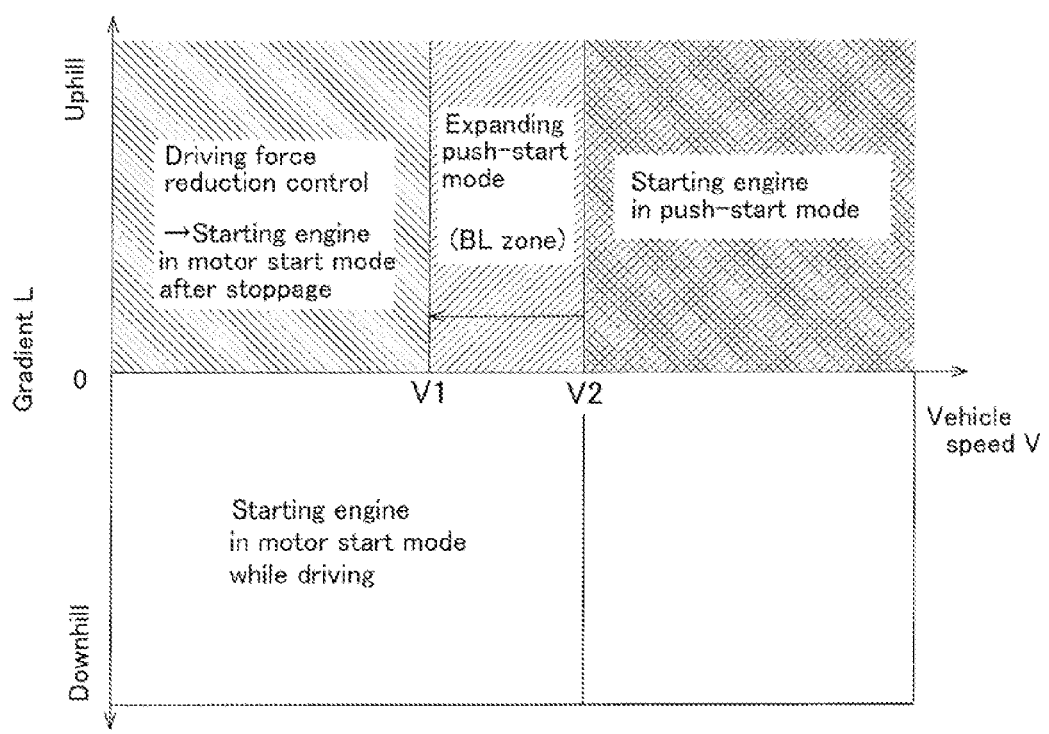
FIG. 5 is a figure illustrating contents of an engine start control depending on a gradient of a road surface on which, and a vehicle speed at which, a vehicle is driving.

FIG. 4 is a timing chart illustrating changes in various values at an engine start in a motor start mode in the motor single driving. The timing chart of the same figure shows changes in, and at each lapse time t of, minimum vehicle speed VL of the engine 2 in the push-start mode, vehicle speed V of the vehicle (actual vehicle speed), state of charge SOC of the battery, required driving force (accelerator pedal opening) AP, driving force reduction control permission flag FG and actual driving force AG. FIG. 5 is a figure illustrating a switching of an engine start control depending on a gradient of a road surface on which, and a vehicle speed at which, the vehicle is driving.

As shown in FIG. 4, at a state of charge SOC of the battery less than a predetermined threshold value at a time t1 when the vehicle is driving only using the driving force of the motor 3 (EV driving), the engine start minimum vehicle speed VL in the push-start mode switches from V1 to V2 (V1>V2), and the driving force reduction control permission flag FG turns ON (driving force reduction control permission state). At the time t11, further, a threshold value APL of the required driving force AP for cancelling the driving force reduction control switches from AP1 to AP2 (AP<AP2). Afterwards, the actual driving force AG transmitted to the driving wheels WR. WL of the vehicle starts to decrease at a time t12 after a predetermined delay time Δt passing from the time t11, and in turn the driving force transmitted to the driving wheels WR, WL from the motor 3 gradually decreases. Afterwards, stepping on the accelerator pedal by the vehicle driver increases the required driving force AP, which then exceeds the threshold value AP2 at a time t13. At this point, the driving force reduction control permission flag FG switches to OFF (driving force reduction control suppression state), whereby the actual driving force AG transmitted to driving wheels WR, WL increases again. Afterwards, the required driving force AP starts decreasing to fall below the threshold value AP2 again at a time t14. At this time, the driving force reduction control permission flag FG switches to ON (driving force reduction control permission). Afterwards, at a time t15 after a predetermined delay time Δt passing from the time t14, the actual driving force AG transmitted to the driving wheels WR, WL starts to decrease, and the driving force of the motor 3 transmitted to the driving wheels WR, WL gradually decreases. And, at a vehicle speed of 0 (substantially 0) at a time t16, the engine 2 is started in the motor start mode. In addition, at this point, the driving force reduction control permission flag FG turns OFF. Due to the engine 2 start, henceforth, the driving force of the engine 2 is transmitted to the driving wheels WR, WL and also to the motor 3, thereby generating power using this motor 3. Accordingly, the vehicle speed V gradually rises to restore the state of charge of the battery.

Thus, at a lower state of charge of the battery 30 during the motor driving, the hybrid vehicle of the present embodiment expands a vehicle speed range (V1→V2) in which the engine start is permitted in the push-start mode. And, on one hand, as shown in FIG. 5, if the vehicle is driving on a hill-climbing road (gradient L≥0), the control device starts the engine in the motor start mode after the vehicle stops. On the other hand, if the vehicle is driving on a flat road or a downhill road (gradient<0), the control device starts the engine in the motor start mode while the vehicle is driving. In addition, at a lower state of charge SOC of the battery in the motor driving, the control device increases the threshold value of the required driving force AP for cancelling the driving force reduction control (AP1→AP2). This can promote the vehicle to stop.

Figure 6:
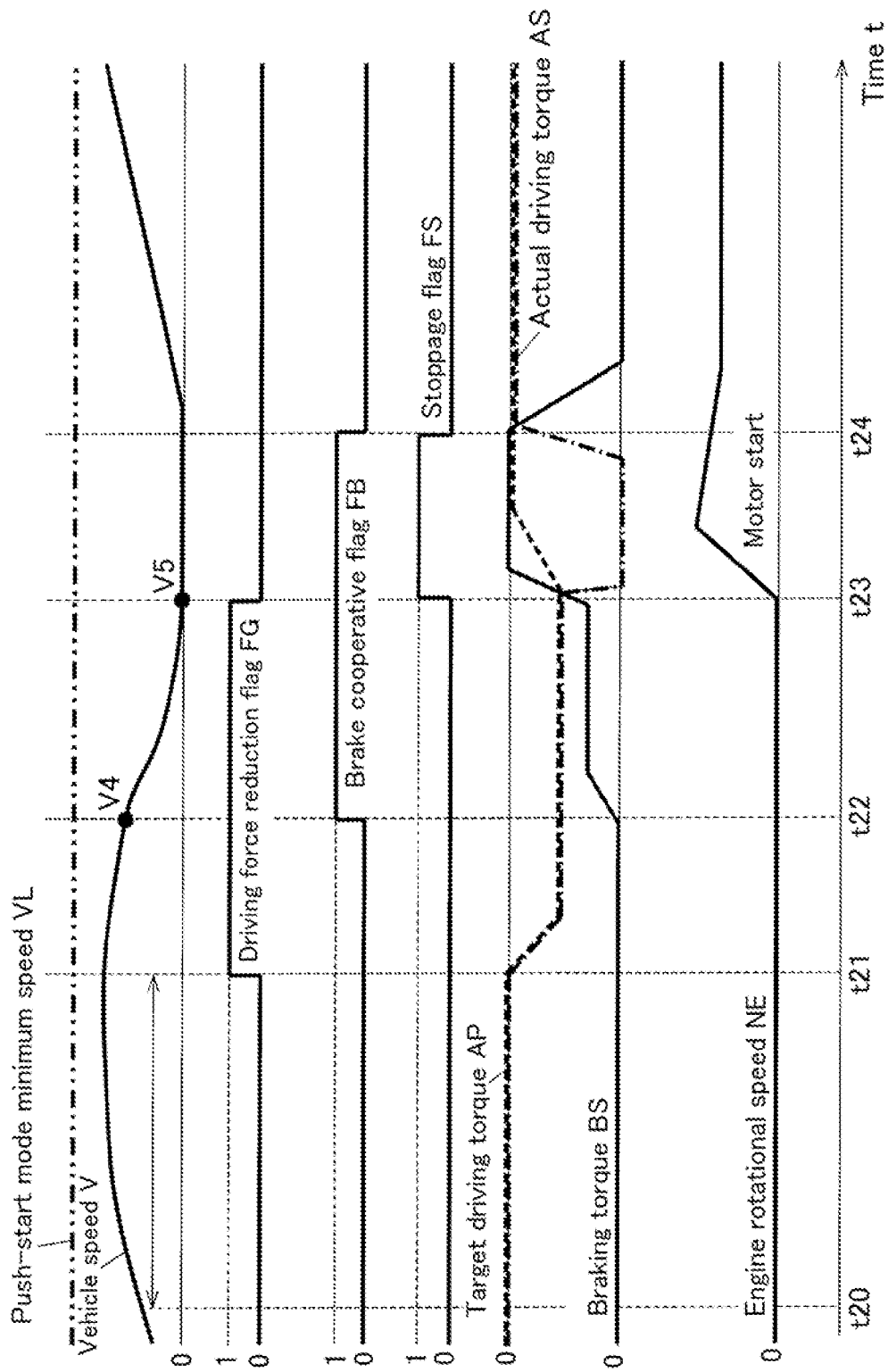
FIG. 6 is a timing chart illustrating changes in various values at an engine start in a motor start mode involving a brake cooperative control in a motor driving.
Figure 7:
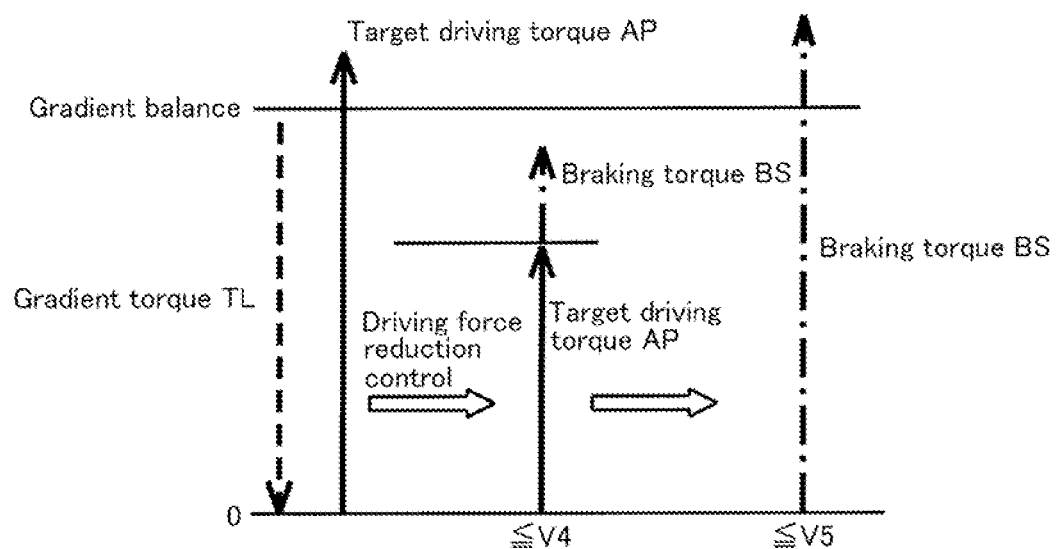
FIG. 7 is a graph illustrating a proportion of torque to a vehicle.

FIG. 6 is a timing chart illustrating changes in various values at an engine start in the motor start mode involving the brake cooperative control in the motor driving while the vehicle is driving on a hill-climbing road. The timing chart of the same figure shows changes in, and at each lapse time t of, engine start minimum vehicle speed VL in the push-start mode, vehicle speed V of the vehicle (actual vehicle speed), driving force reduction control permission flag FG, brake cooperative flag FB, stoppage flag FS, target driving torque AP, actual driving torque AS, braking torque BS and engine rotational speed NE. FIG. 7 is a graph illustrating a proportion of torque to the vehicle when the vehicle is driving on the hill-climbing road.

As shown in FIG. 6, in driving at a vehicle speed lower than the engine start minimum vehicle speed VL (V≤VL) in the push-start mode (from t20 to t21) for a predetermined time when the vehicle is driving only using a driving force of the motor 3 (EV driving) on the hill-climbing road, the driving force reduction control permission flag FG turns ON at a time t21. Thus, the target driving torque AP and the actual driving torque AS start to decrease. Afterwards, the vehicle speed V falls below a threshold value V4 at a time t22 (V<V4), whereby the brake cooperative flag FB turns ON. Due to this, the braking torque BS starts to increase. In this way, starting to impart a braking force of the brake before the vehicle stops can prevent a backward movement unintended by the vehicle driver from occurring when the vehicle stops. Afterwards, the vehicle is judged to be in a stopped state at a vehicle speed lowered below a threshold value V5 (<V4) at a time t23, whereby the stoppage flag FS turns ON. Simultaneously, the braking torque BS increases up to torque equivalent to the target driving torque AP, thereby imparting a braking force to the vehicle. Further, due to this, the actual driving torque AS becomes 0. In this state, the engine 2 is started in the motor start mode. After the engine 2 starts, the driving force reduction control permission flag FG is turned OFF. After the engine starts in the motor start mode, a clutch engagement of the shifting mechanism is completed. After the actual driving torque AS rises to the target driving force, the brake cooperative flag FB and the stoppage flag FS are turned OFF and the braking torque BS is reduced, whereby the imparting of the braking force is cancelled (at a time t24). Henceforth, the vehicle speed V gradually increases.

As shown in FIG. 7, in a state in which the vehicle is driving on the hill-climbing road only using the driving force of the motor 3 (EV driving), the target driving torque AP of the vehicle is set to be larger than gradient torque of the hill-climbing road that is acting to the backward direction of the vehicle (AP>TL). Afterwards, when the vehicle speed V gradually decreases to fall below the threshold value V4, the target driving force AP is reduced on one hand, and the braking torque BS is imparted to the vehicle on the other hand. Afterwards, at a time when the vehicle speed V further decreases to fall below a threshold value V5, braking torque BS larger than gradient torque TL of the hill-climbing road acting to the backward direction of the vehicle is imparted to the vehicle (brake cooperative control). In that state, the engine is started in the motor start mode. This can prevent the backward movement unintended by the vehicle driver when the vehicle stops on the hill-climbing road.

Figure 8:
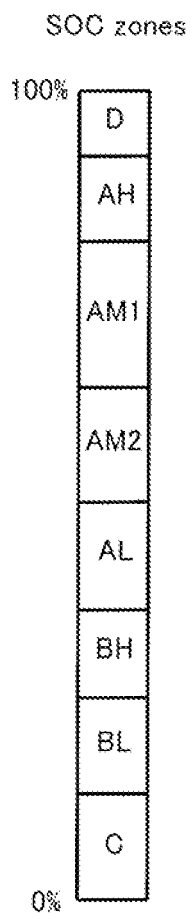
FIG. 8 is a graph illustrating one example for zones of state of charge of a battery.
Figure 9:
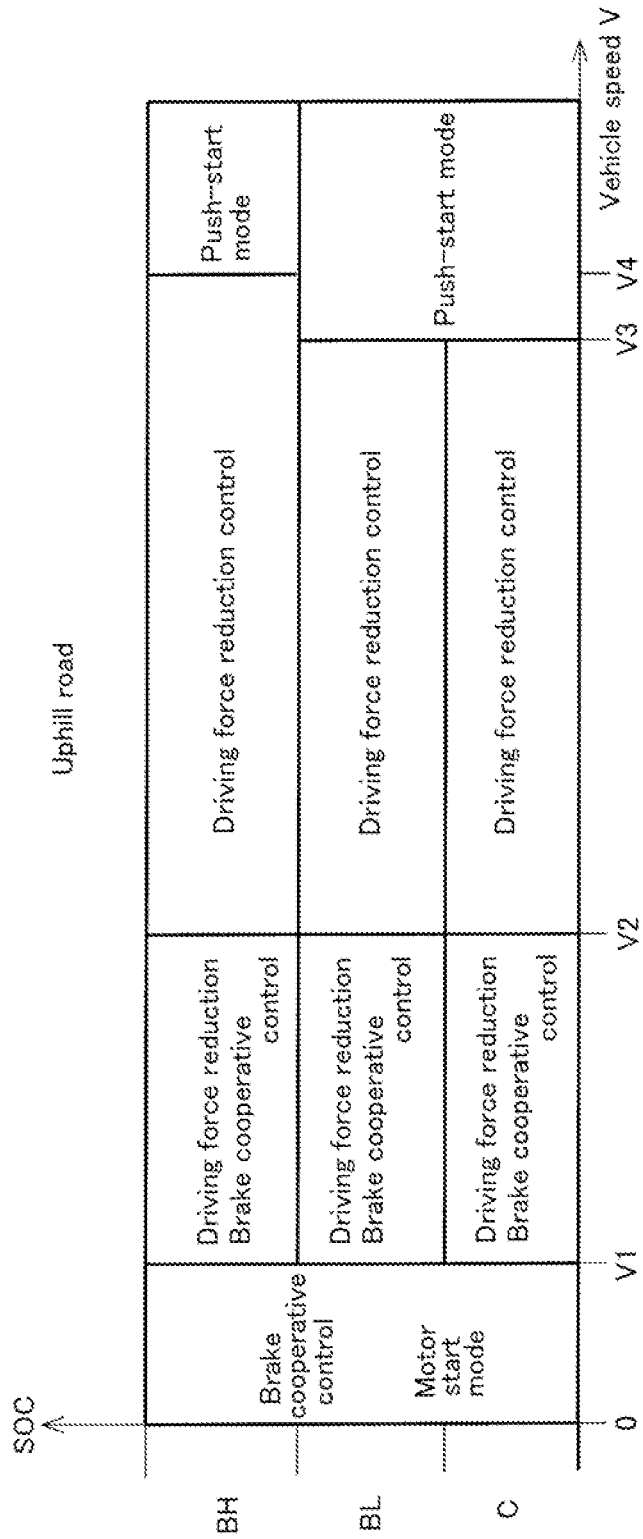
FIG. 9 is a diagram illustrating an engine start control depending on a state of charge of a battery and a vehicle speed when a vehicle is driving on a hill-climbing road.

FIG. 8 is a graph illustrating one example for zones of state of charge of the battery. And, FIG. 9 is a diagram illustrating an engine start control depending on a state of charge of the battery and a vehicle speed when the vehicle is driving on the hill-climbing road. As shown in FIG. 8, the state of charge (SOC) of the battery is divided into D, AH, AM1, AM2, AL, BH, BL and C in order of decreasing state of charge between 100% and 0%. It should be noted that each of reference codes assigned to each of the zones is one example.

As shown in FIG. 9, at a vehicle speed equal to or less than V1, in a state in which the state of charge of the battery 30 is in either of the zones BH, BL or C on a lower state of charge side, when the vehicle is driving only using the driving force of the motor 3 (EV driving) on the hill-climbing road, the vehicle performs a brake cooperative control and starts the engine in the motor start mode. In other words, upon stopping the vehicle by performing the brake cooperative control after decelerating the vehicle due to a driving force reduction control, the engine 2 is started the motor start mode. In addition, at a vehicle speed V equal to or more than V1 and less than V2 (V1≤V<V2), the above-described driving force reduction control and the above-described brake cooperative control are performed. It should be noted that the driving force reduction control and the brake cooperation control in this case are cancelled subject to stepping on the accelerator pedal by the vehicle driver (increase in accelerator opening). A threshold value of this accelerator opening at which the driving force reduction control and the brake cooperative control are cancelled is set to be smaller as the state of charge of the battery 30 is larger.

In addition, at a vehicle speed V equal to or more than V2 and less than V4 (V2≤V<V4) in a state in which the state of charge of the battery 30 is in the zone BH, and at a vehicle speed V equal to or more than V2 and less than V3 (V2≤V<V3) in a state in which the state of charge of the battery is in either of the zones BL or C, only the above-described driving force reduction control is performed. And, the driving force reduction control in this case is also cancelled subject to stepping on the accelerator pedal by the vehicle driver (increase in accelerator opening). A threshold value of this accelerator opening at which the driving force reduction control is cancelled is set to be smaller as the state of charge of the batter is larger. Further, this driving force reduction control is also cancelled at a vehicle speed V equal to or more than the engine start minimum vehicle speed V3 or V4 in the push-start mode, or when the engine 2 is started in the motor start mode. Also, at a vehicle speed V equal to or more than V4 (V4≤V) in the state in which the state of charge of the battery is in the zone BH, and at a vehicle speed V equal to or more than V3 (V3≤V) in the state in which the state of charge of the battery is in the zone BL or C, the engine 2 is started in the push-start mode. As described above, varying the vehicle speed (V3, V4), at which the engine is permitted to start in the push-start mode, depending on the state of charge (SOC) of the battery narrows down an execution range for the driving force reduction control to a maximum extent, thereby enlarging an execution range for the engine start in the push-start mode.

Figure 10:
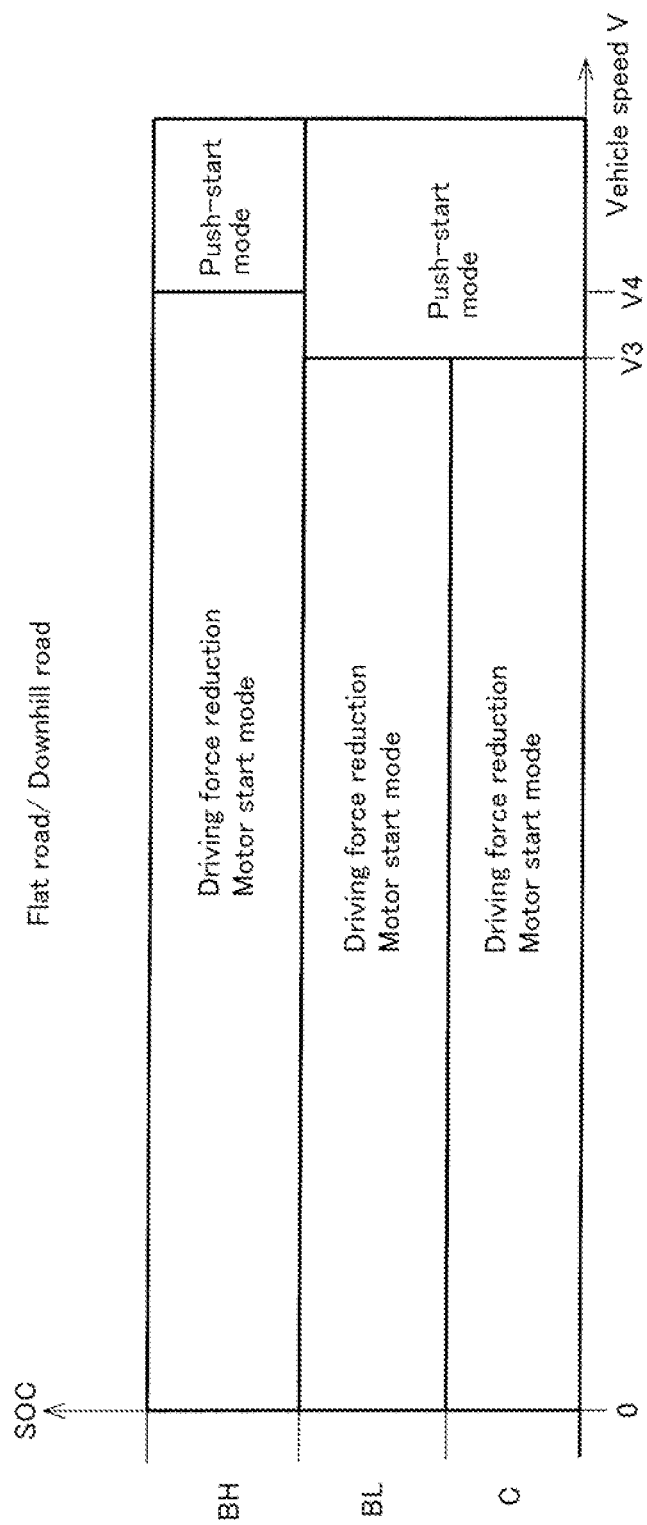
FIG. 10 is a diagram illustrating an engine start control depending on a state of charge of a battery and a vehicle speed when a vehicle is driving on a flat road or a downhill road.

FIG. 10 is a diagram illustrating an engine start control depending on a state of charge of the battery and a vehicle speed when the vehicle is driving on a flat road or a downhill road. When the vehicle is driving on the flat road or the downhill road only using a driving force of the motor 3 (EV driving) at a vehicle speed V equal to or more than 0 and less than V4 in the state in which the state of charge of the battery is in the zone BH (V2≤V<V4), and at a vehicle speed V equal to or more than 0 and less than V3 (V2≤V<V3) in the state in which the state of charge of the battery is in the zone BL or C, the above-described driving force reduction control and the above-described engine start control are performed in the motor start mode. And, the driving force reduction control and the engine start control in the motor start mode in this case are cancelled subject to stepping on the accelerator pedal by the vehicle driver (increase in accelerator opening). A threshold value of the accelerator opening at which the driving force reduction control and the engine start control are cancelled is set to be smaller as the state of charge of the battery is larger. In this way, no brake cooperative control is performed on the flat road or the downhill road. It is because the vehicle driver might feel a sense of incongruity about behaviors of the vehicle if the vehicle is stopped in the brake cooperative control while driving on the flat road or the downhill road, and the stoppage in this vehicle speed range occurs only when the vehicle driver steps on the brake pedal.

Further, at a vehicle speed V equal to or more than V4 (V4≤V) in the state in which the state of charge of the battery is in the zone BH and at a vehicle speed V equal to or more than V3 (V3≤V) in the state in which the battery state of charge is in the zone BL or C, the engine 2 is started in the push-start mode. In this case also, as described above, changes in the CL start execution vehicle speed (V3, V4) depending on the state of charge (SOC) of the battery narrows down the execution range for the driving force reduction control to a maximum extent.

As described above, the hybrid vehicle of the present embodiment includes the engine 2 and the motor (electric motor) 3 as the driving sources, the transmission 4 that can change speed of a mechanical power from the engine 2 and the motor 3 to be transmitted to the driving wheels WR, WL side, and the ECU (control means) 10 for controlling a vehicle driving using the transmission 4. As a transmission route of a driving force, the transmission 4 includes the first transmission route between the engine 2 and the driving wheels WR, WL, the second transmission route between the motor 3 and the driving wheels WR, WL, and the third transmission route between the motor 3 and the engine 2. And, as a mode for starting the engine 2 during the motor single driving, which is a vehicle driving only using the motor 3 as the driving source, the hybrid vehicle can set the two modes. One is the push-start mode in which the driving force from the driving wheels WR, WL is transmitted to the engine 2 via the first transmission route at a vehicle speed V equal to or more than a predetermined vehicle speed, thereby starting the engine 2. The other is the motor start mode in which the engine 2 is started using the driving force of the motor 3 via the third transmission route at a vehicle speed V equal to or less than the predetermined vehicle speed, as well as in the stopped state. And, at a vehicle speed V out of a vehicle speed range in which either one of the push-start mode or the motor start mode is executable (0<V<V3 or V4) when a start command of the engine 2 occurs in driving only using the motor 3 as the driving source, the driving force reduction control is performed for reducing the driving force transmitted to the driving wheels WR, WL from the motor 3.

According to the hybrid vehicle in accordance with the present invention, on one hand, the push-start mode in which a driving force is transmitted from the driving wheels WR, WL to the engine 2 via the first transmission route to start the engine is executable only at a vehicle speed V equal to or more than the predetermined vehicle speed (equal to or more than V3 or V4). On the other hand, the motor start mode in which the engine 2 is started using the driving force of the motor 3 via the third transmission route is executable only at a vehicle speed V substantially in the stopped state. And, the vehicle speed range in which the engine 2 fails to start in the push-start mode and the motor start mode is limited to a relatively low-speed range in which, including a state of driving at an extremely low speed in a traffic congestion and a state of driving on a hill-climbing road at a low speed. Therefore, here, when the vehicle is driving at a vehicle speed V in such vehicle speed range, the control device performs a control to reduce the driving force transmitted to the driving wheels WR, WL of the vehicle from the motor 3 so as to shift from this vehicle speed range to another vehicle speed range. Accordingly, the control device promotes an increase in vehicle speed due to an increase in accelerator opening by the vehicle driver's stepping on the accelerator pedal or a decrease in vehicle speed by the vehicle driver's stepping on the brake, thereby increasing the vehicle speed up to the range in which the engine can start in the push-start mode, or reduce the vehicle speed down to the range in which the engine 2 can start in the motor start mode. Thus, shifting the engine 2 to the vehicle speed range in which the engine 2 can start can achieve an increase in timing for starting the engine 2, allowing to avoid a shortage of state of charge of the battery associated with the motor single driving.

Further, in the hybrid vehicle provided with the twin clutch type transmission 4 of the above-described configuration, the push-start mode for starting the engine 2 during the motor single driving, which is the vehicle driving only using the motor 3 as the driving source, establishes either one of the gear positions of the second shifting mechanism G2 and engages the second clutch C2 in the state in which the vehicle is driving by transmitting the driving force from the motor 3 to the driving wheels WR, WL side via the first shifting mechanism G1, thereby transmitting the driving force from the driving wheels WR, WL to the engine 2 via the second shifting mechanism G2 and the second clutch C2 and consequently starting the engine 2. The motor start mode sets each of the gear positions of the first shifting mechanism G1 to neutral to engage the first clutch C1, thereby starting the engine 2 using the driving force of the motor 3.

In addition, the hybrid vehicle of the present embodiment is configured to cancel the driving force reduction control at an accelerator pedal opening detected by the accelerator pedal opening sensor 31 equal to or more than a predetermined value while performing the driving force reduction control.

If continuing the driving force reduction control at an accelerator opening equal to or more than the predetermined opening in response to an acceleration demand of the vehicle from the vehicle driver during the driving force reduction control, the vehicle driver might feel a sense of incongruity with a running condition of the vehicle such as an impression of being short of accelerated velocity of the vehicle. Therefore, at the accelerator opening equal to or more than the predetermined opening, the control device should cancel the driving force reduction control for preventing the driver from feeling the impression of being short of accelerated velocity.

Further, in cancellation of the driving force reduction control, the hybrid vehicle of the present embodiment is configured to perform the driving force reduction control again at an accelerator pedal opening detected by the accelerator pedal opening sensor 31 less than a predetermined value.

In other words, if the vehicle driver cancels or weakens stepping on the accelerator pedal after cancelling the driving force reduction control, the control means again preforms the driving force reduction control to press the vehicle driver to step on the accelerator pedal or the brake pedal. Due to this, the vehicle speed rises to the range in which the engine can start in the push-start mode or falls to the range in which the engine 2 can start in the motor start mode.

Further, at a low vehicle speed equal to or less than the predetermined speed during the driving force reduction control, the control means performs the above-described brake cooperative control (braking the vehicle using the brake) and starts the engine in the motor start mode. At a low vehicle speed equal to or less than the predetermined vehicle speed, the control means starts the engine in the motor start mode while braking the vehicle in the brake cooperative control. This can prevent the vehicle from moving backward due to a decrease in vehicle speed caused by the driving force reduction control when the vehicle is driving on the hill-climbing road. The brake cooperative control here can impart a braking force to the vehicle (brake by wire) regardless of whether there is an operation by the vehicle driver, and therefore can do the same without the operation by the vehicle driver.

In addition, the hybrid vehicle of the present embodiment starts the engine in the push-start mode at a vehicle speed equal to or more than a predetermined vehicle speed during the driving force reduction control.

Furthermore, depending on a gradient of a road surface on which the vehicle is driving, the hybrid vehicle of the present embodiment expands a vehicle speed range that permits the engine start in the push-start mode, thereby prioritizing the engine start in the push-start mode. This can avoid a shortage of state of charge of the battery 30 during the motor single driving and also secure the vehicle driving.

In addition, if the vehicle is judged to be driving on the hill-climbing road (if the gradient of the road surface on which the vehicle is driving is equal to or more than a predetermined value), the hybrid vehicle of the present embodiment performs the driving force reduction control. When judged to be driving on a flat road or a downhill road (if the gradient of the road surface on which the vehicle is driving is less the predetermined value), the hybrid vehicle has neither a risk of staying in the vehicle speed range in which the engine 2 fails to start in the above-described push-start mode and the above-described motor start mode, nor of moving backward due to an inertial force to the vehicle. Therefore, the hybrid vehicle is configured to perform the driving force reduction control only when judged to be driving on a hill-climbing road and shift to a vehicle speed range in which the motor start mode or the push-start mode is executable.

Further, the hybrid vehicle of the present embodiment provides a predetermined delay time (delay timer) from a command to an execution of the driving force reduction control. Accordingly, providing the predetermined delay time (hysteresis) from the command to the execution of the driving force reduction control can prevent hunting of the driving force reduction control.

In addition, the hybrid vehicle of the present embodiment is configured to issue a command for starting the engine 2 at a state of charge of the battery 30 detected by the state of charge detector 39 equal to or less than a predetermined value. According to this, starting the engine 2 at the state of charge of the battery 30 equal to or less than the predetermined value can securely avoid a shortage of state of charge of the battery 30 in the motor single driving and also secure the vehicle driving.

While the embodiment of the invention has been described, it is to be understood that the invention is not limited to the foregoing embodiment. Rather, the invention can be modified to incorporate any number of variations or alterations within the scope of claims and the scope of technical concept described in the specification and the drawings thereof. For example, in the above-described embodiment, the control in accordance with the present invention is performed on the basis of a vehicle speed detected by the vehicle speed sensor and a gradient detected by the gradient sensor. In addition, the vehicle speed and the gradient of the road surface on which the vehicle is driving may be judged on the basis of information attainable from a car navigation system. Further, the concrete configuration of the driving device including the transmission 4 provided by the hybrid vehicle is one example. Accordingly, the driving device provided by the hybrid vehicle in accordance with the present invention may include another configuration than the above-described.

The invention claimed is:
1. A control device for a hybrid vehicle, the control device comprising:
an engine and an electric motor as driving sources;
a driving device for changing speed of a mechanical power from the engine and the electric motor, the mechanical power transmittable to a vehicle propelling shaft engaged with driving wheels;
an electronic control unit for controlling a vehicle driving using the driving device;

a gradient detection sensor for detecting a gradient of a road surface on which the vehicle is driving; and a vehicle speed sensor for detecting a vehicle speed, wherein the driving device has transmission routes for a driving force, comprising at least a first transmission route between the engine and the driving wheels, a second transmission route between the electric motor and the driving wheels and a third transmission route between the electric motor and the engine, wherein when a vehicle is being driven using only the electric motor, the electronic control unit has, as modes for starting the engine, a push-start mode and a motor start mode, the push-start mode for starting the engine by transmitting a driving force from the driving wheels to the engine via the first transmission route when the detected vehicle speed is equal to or greater than a first predetermined vehicle speed, the motor start mode for starting the engine using a driving force of the electric motor via the third transmission route when the detected vehicle speed is equal to or less than a second predetermined vehicle speed as well as when the vehicle is in a stopped state, and wherein the electronic control unit reduces a driving force transmitted from the electric motor to the driving wheels of the vehicle when a start command of the engine occurs while driving using only the electric motor as the driving source and at a detected vehicle speed that is in a vehicle speed range in which neither the push-start mode nor the motor start mode is executable, wherein depending on the gradient of the road surface on which the vehicle is driving, the control device expands a vehicle speed range permitting an engine start in the push-start mode.

2. A control device for a hybrid vehicle, the control device comprising:

an engine and an electric motor as driving sources;

a driving device for changing speed of a mechanical power from the engine and the electric motor, the mechanical power transmittable to a vehicle propelling shaft engaged with driving wheels; and an electronic control unit for controlling a vehicle driving using the driving device, wherein the control device comprises:

a first shifting mechanism for receiving to a first input shaft the mechanical power from an output shaft of the engine and the electric motor and changing gears to any one of a plurality of gear positions, the mechanical power transmittable to a vehicle propeller shaft;

a second shifting mechanism for receiving to a second input shaft the mechanical power from an output shaft of the engine and changing gears to any one of the plurality of gear positions, the mechanical power transmittable to the vehicle propeller shaft;

a first clutch that can engage between the output shaft of the engine and the first input shaft;

a second clutch that can engage between the output shaft of the engine and the second input shaft; and a vehicle speed sensor for detecting a vehicle speed; and a gradient detection sensor for detecting a gradient of a road surface on which the vehicle is driving, wherein when a vehicle is being driven using only the electric motor, the electronic control unit has as modes for starting the engine, a push-start mode and a motor start mode, the push-start mode for establishing either one of the gear positions of the second shifting mechanism and putting the second clutch in engagement in a state in which the vehicle is driving while a driving force is being transmitted from the electric motor to driving wheels via the first shifting mechanism, thereby transmitting the driving force from the driving wheels to the engine via the second shifting mechanism and the second clutch to start the engine at a detected vehicle speed that is equal to or greater than a first predetermined vehicle speed, the motor start mode for shifting any of the gear positions of the first shifting mechanism to neutral and putting the first clutch in engagement at the detected vehicle speed that is equal to or less than a second predetermined vehicle speed as well as when the vehicle is in the stopped state, thereby starting the engine using the driving force of the electric motor, and wherein when a start command of the engine occurs while driving using only the electric motor as a driving source and at the detected vehicle speed that is in a vehicle speed range in which neither the push-start mode nor the motor start mode is executable, the electronic control unit reduces a driving force transmitted from the electric motor to the driving wheels of the vehicle, and wherein depending on the gradient of the road surface on which the vehicle is driving, the control device expands a vehicle speed range permitting an engine start in the push-start mode.

3. The control device for the hybrid vehicle according to claim 1, the control device comprising:

an accelerator pedal sensor for detecting an accelerator opening, wherein the control unit cancels the driving force reduction control at an accelerator opening detected by the accelerator pedal sensor equal to or more than a predetermined value during the driving force reduction control.

4. The control device for the hybrid vehicle according to claim 3, wherein the electronic control unit again performs the driving force reduction control at an accelerator opening detected by the accelerator pedal sensor less than the predetermined opening in cancellation of the driving force reduction control.

5. The control device for the hybrid vehicle according to claim 1, the control device comprising:

a brake for imparting a braking force to the vehicle, wherein during the driving force reduction control and at the detected vehicle speed equal to or less than a third predetermined value, the electronic control unit controls braking of the vehicle is using the brake and starts the engine in the motor start mode.

6. The control device for the hybrid vehicle according to claim 1, wherein the control device starts the engine in the push-start mode at a vehicle speed detected by the vehicle speed sensor equal to or more than the predetermined vehicle speed during the driving force reduction control.

7. The control device for the hybrid vehicle according to claim 1, wherein the electronic control unit performs the driving force reduction control at a gradient of the road surface detected by the gradient detection sensor equal to or more than a predetermined gradient.

8. The control device for the hybrid vehicle according to claim 1, wherein a predetermined delay time is provided from a command to an execution of the driving force reduction control using the electronic control unit.

9. The control device for the hybrid vehicle according to claim 1, the control device comprising:
a capacitor enabled to give and receive an electric power to and from the electric motor; and
a state of charge detector for detecting a state of charge of the capacitor,
wherein depending on the state of charge of the capacitor detected by the state of charge detection means, the electronic control unit varies a vehicle speed range in which the push-start mode is executable.

10. The control device for the hybrid vehicle according to claim 1, the control device comprising:
a capacitor enabled to give and receive an electric power to and from the electric motor; and
a state of charge detector for detecting a state of charge of the capacitor,
wherein at a state of charge of the capacitor detected by the state of charge detector equal to or less than a predetermined value, the electronic control unit issues an engine start command.

11. The control device for the hybrid vehicle according to claim 2, the control device comprising:
an accelerator pedal sensor for detecting an accelerator opening,
wherein the electronic control unit cancels the driving force reduction control at an accelerator opening detected by the accelerator pedal sensor equal to or more than a predetermined value during the driving force reduction control.

12. The control device for the hybrid vehicle according to claim 2, the control device comprising:
a brake for imparting a braking force to the vehicle,
wherein during the driving force reduction control and at the detected vehicle speed equal to or less than a third predetermined value, the electronic control unit controls braking of the vehicle is using the brake and starts the engine in the motor start mode.

13. The control device for the hybrid vehicle according to claim 2, wherein the control device starts the engine in the push-start mode at a vehicle speed detected by the vehicle speed sensor equal to or more than the predetermined vehicle speed during the driving force reduction control.

14. The control device for the hybrid vehicle according to claim 2,
wherein the electronic control unit performs the driving force reduction control at a gradient of the road surface detected by the gradient detection sensor equal to or more than a predetermined gradient.

15. The control device for the hybrid vehicle according to claim 2, wherein a predetermined delay time is provided from a command to an execution of the driving force reduction control using the electronic control unit.

16. The control device for the hybrid vehicle according to claim 2, the control device comprising:
a capacitor enabled to give and receive an electric power to and from the electric motor; and
a state of charge detector for detecting a state of charge of the capacitor,
wherein depending on the state of charge of the capacitor detected by the state of charge detector, the electronic control unit varies a vehicle speed range in which the push-start mode is executable.

17. The control device for the hybrid vehicle according to claim 2, the control device comprising:
a capacitor enabled to give and receive an electric power to and from the electric motor; and
a state of charge detector for detecting a state of charge of the capacitor,
wherein at a state of charge of the capacitor detected by the state of charge detector equal to or less than a predetermined value, the electronic control unit issues an engine start command.

18. A control device for a hybrid vehicle, the control device comprising:
an engine and an electric motor as driving sources;
a driving device for changing speed of a mechanical power from the engine and the electric motor, the mechanical power transmittable to a vehicle propelling shaft engaged with driving wheels;
an electronic control unit for controlling a vehicle driving using the driving device;
a capacitor enabling to give and receive an electric power to and from the electric motor;
a state of charge detector for detecting a state of charge of the capacitor; and
a vehicle speed sensor for detecting a vehicle speed,
wherein the driving device has transmission routes for a driving force, comprising at least a first transmission route between the engine and the driving wheels, a second transmission route between the electric motor and the driving wheels and a third transmission route between the electric motor and the engine,
wherein when a vehicle is being driven using only the electric motor, the electronic control unit has, as modes for starting the engine, a push-start mode and a motor start mode, the push-start mode for starting the engine by transmitting a driving force from the driving wheels to the engine via the first transmission route when the detected vehicle speed is equal to or greater than a first predetermined vehicle speed, the motor start mode for starting the engine using a driving force of the electric motor via the third transmission route when the detected vehicle speed is equal to or less than a second predetermined vehicle speed as well as when the vehicle is in a stopped state, and
wherein the electronic control unit reduces a driving force transmitted from the electric motor to the driving wheels of the vehicle when a start command of the engine occurs while driving using only the electric motor as the driving source and at a detected vehicle speed that is in a vehicle speed range in which neither the push-start mode nor the motor start mode is executable,
wherein depending on the state of charge of the capacitor detected by the state of charge detection detector, the electronic control unit varies a vehicle speed range in which the push-start mode is executable.

19. A control device for a hybrid vehicle, the control device comprising:
an engine and an electric motor as driving sources;
a driving device for changing speed of a mechanical power from the engine and the electric motor, the mechanical power transmittable to a vehicle propelling shaft engaged with driving wheels; and
an electronic control unit for controlling a vehicle driving using the driving device,
wherein the control device comprises:
a first shifting mechanism for receiving to a first input shaft a mechanical power from an output shaft of the engine and the electric motor and changing gears using either one of a plurality of gear positions, the mechanical power transmittable to a vehicle propeller shaft;

a second shifting mechanism for receiving to a second input shaft a mechanical power from an output shaft of the engine and changing gears using either one of the plurality of gear positions, the mechanical power transmittable to the vehicle propeller shaft;

a first clutch that can engage between the output shaft of the engine and the first input shaft;

a second clutch that can engage between the output shaft of the engine and the second input shaft; and a vehicle speed sensor for detecting a vehicle speed;

a capacitor enabling to give and receive an electric power to and from the electric motor; and a state of charge detector for detecting a state of charge of the capacitor, wherein when a vehicle is being driven using only the electric motor, the electronic control unit has as modes for starting the engine, a push-start mode and a motor start mode, the push-start mode for establishing either one of the gear positions of the second shifting mechanism and putting the second clutch in engagement in a state in which the vehicle is driving while a driving force is being transmitted from the electric motor to driving wheels via the first shifting mechanism, thereby transmitting the driving force from the driving wheels to the engine via the second shifting mechanism and the second clutch to start the engine at a detected vehicle speed that is equal to or greater than a first predetermined vehicle speed, the motor start mode for shifting any of the gear positions of the first shifting mechanism to neutral and putting the first clutch in engagement at the detected vehicle speed that is equal to or less than a second predetermined vehicle speed as well as when the vehicle is in the stopped state, thereby starting the engine using the driving force of the electric motor, and wherein when a start command of the engine occurs while driving using only the electric motor as a driving source and at the detected vehicle speed that is in a vehicle speed range in which neither the push-start mode nor the motor start mode is executable, the electronic control unit reduces a driving force transmitted from the electric motor to the driving wheels of the vehicle, and wherein depending on the state of charge of the capacitor detected by the state of charge detector, the electronic control unit varies a vehicle speed range in which the push-start mode is executable.

20. A control device for a hybrid vehicle, the control device comprising:

an engine;

an electric motor; and an electronic control unit for controlling a vehicle driving; and a vehicle speed sensor for detecting a vehicle speed, wherein when a vehicle is being driven using only the electric motor, the electronic control unit has, as modes for starting the engine, a push-start mode and a motor start mode, the push-start mode is in a state which the vehicle is driving by the driving force transmitted from the electric motor and when the detected vehicle speed is equal to or less than a first predetermined vehicle speed, thereby transmitting the driving force to the engine and starting the engine, the motor start mode for starting the engine using a driving force of the electric motor when the detected vehicle speed is equal to or less than a second predetermined vehicle speed as well as when the vehicle is in the stopped state, and wherein when a start command of the engine occurs while driving using only the electric motor as a driving source and at the detected vehicle speed that is in a vehicle speed range in which neither the push-start mode nor the motor start mode is executable, the electronic control unit reduces a driving force transmitted from the electric motor the control device comprising a gradient detection sensor for detecting a gradient of a road surface on which the vehicle is driving, wherein depending on the gradient of the road surface on which the vehicle is driving, the control device expands a vehicle speed range permitting an engine start in the push-start mode.

21. A control device for a hybrid vehicle, the control device comprising:

an engine;

an electric motor; and an electronic control unit for controlling a vehicle driving; and a vehicle speed sensor for detecting a vehicle speed, wherein when a vehicle is being driven using only the electric motor, the electronic control unit has, as modes for starting the engine, a push-start mode and a motor start mode, the push-start mode is in a state which the vehicle is driving by the driving force transmitted from the electric motor and when the detected vehicle speed is equal to or less than a first predetermined vehicle speed, thereby transmitting the driving force to the engine and starting the engine, the motor start mode for starting the engine using a driving force of the electric motor when the detected vehicle speed is equal to or less than a second predetermined vehicle speed as well as when the vehicle is in the stopped state, and wherein when a start command of the engine occurs while driving using only the electric motor as a driving source and at the detected vehicle speed that is in a vehicle speed range in which neither the push-start mode nor the motor start mode is executable, the electronic control unit reduces a driving force transmitted from the electric motor the control device comprising:

a capacitor enabling to give and receive an electric power to and from the electric motor; and a state of charge detector for detecting a state of charge of the capacitor, wherein depending on the state of charge of the capacitor detected by the state of charge detector, the electronic control unit varies a vehicle speed range in which the push-start mode is executable.

* * * * *